(12) United States Patent
Callegari et al.

(10) Patent No.: US 11,167,467 B2
(45) Date of Patent: Nov. 9, 2021

(54) BOTTLING APPARATUS IN ASEPTIC CONDITIONS FOR CONTAINERS MADE OF THERMOPLASTIC MATERIAL

(71) Applicant: GEA PROCOMAC S.P.A., Sala Baganza (IT)

(72) Inventors: Fabio Callegari, Salsomaggiore Terme (IT); Paolo Abelli, Parma (IT)

(73) Assignee: GEA PROCOMAC S.P.A., Sala Baganza (IT)

( * ) Notice: Subject to any disclaimer, the term of this patent is extended or adjusted under 35 U.S.C. 154(b) by 0 days.

(21) Appl. No.: 16/648,838

(22) PCT Filed: Feb. 20, 2019

(86) PCT No.: PCT/IB2019/051386
§ 371 (c)(1),
(2) Date: Mar. 19, 2020

(87) PCT Pub. No.: WO2019/211673
PCT Pub. Date: Nov. 7, 2019

(65) Prior Publication Data
US 2021/0053272 A1 Feb. 25, 2021

(30) Foreign Application Priority Data

May 4, 2018 (IT) .......................... 102018000005081

(51) Int. Cl.
*B29C 49/42* (2006.01)
*B29C 49/46* (2006.01)
(Continued)

(52) U.S. Cl.
CPC .............. *B29C 49/46* (2013.01); *B29C 33/72* (2013.01); *B29C 49/30* (2013.01);
(Continued)

(58) Field of Classification Search
CPC ...... B29C 2049/129; B29C 2049/5875; B29C 2049/705; B29C 49/46; B29C 49/4236;
(Continued)

(56) References Cited

U.S. PATENT DOCUMENTS 4,208,852 A * 6/1980 Pioch ...................... B29C 49/46
141/243
2011/0241265 A1 10/2011 Schmidt
(Continued)

FOREIGN PATENT DOCUMENTS

EP 2279850 2/2011
EP 3357668 8/2018

*Primary Examiner* — Robert B Davis
(74) *Attorney, Agent, or Firm* — Pearne & Gordon LLP (57) ABSTRACT

A bottling apparatus (1) in aseptic conditions of containers (100) made of a thermoplastic material, comprising: at least one mobile organ such as, for example, a blowing nozzle (24) that is partially located in a contamination-controlled environment (3) isolated from an external environment (4); a linear motor (6) for driving the mobile organ (24), the linear motor (6) comprising a cylindrical stator (7) and a rotor or magnetic shaft (8) integrally connected to the mobile organ (24), the separation volume between the rotor (8) and the cylindrical stator (7) being sanitisable by means of a sanitising fluid that passes through a grooved surface (14, 15, 18).

17 Claims, 9 Drawing Sheets (51) Int. Cl.
  *B29C 49/56* (2006.01)
  *B29C 49/70* (2006.01)
  *B29C 33/72* (2006.01)
  *B29C 49/30* (2006.01)
  *B67C 3/22* (2006.01)
  *B67C 7/00* (2006.01)

(52) U.S. Cl.
  CPC ...... *B29C 49/4236* (2013.01); *B29C 49/4273* (2013.01); *B29C 49/56* (2013.01); *B67C 3/22* (2013.01); *B67C 7/004* (2013.01); *B29C 2049/4679* (2013.01); *B29C 2049/705* (2013.01); *B67C 2003/227* (2013.01); *B67C 2007/006* (2013.01); *B67C 2007/0066* (2013.01)

(58) Field of Classification Search
  CPC ................ B29C 49/4273; B29C 49/56; B29C 2049/4679; B29C 2049/4697; B29C 49/4205; B29C 49/421; B67C 7/004; B67C 2007/006; B67C 2007/0066; B67C 2003/227
  See application file for complete search history.

(56) References Cited

U.S. PATENT DOCUMENTS

2012/0321741 A1* 12/2012 Voth ........................ B29C 49/56
  425/533
  2020/0346388 A1* 11/2020 Abelli ..................... B29C 49/46

* cited by examiner

BOTTLING APPARATUS IN ASEPTIC CONDITIONS FOR CONTAINERS MADE OF THERMOPLASTIC MATERIAL

TECHNICAL FIELD

The present invention relates to a bottling apparatus in aseptic conditions for containers made of thermoplastic material.

BACKGROUND ART

As is known, a bottling apparatus in aseptic conditions includes a unit for forming containers starting from parisons made of thermoplastic material. For example, the forming unit comprises a stretch-blowing carousel with a plurality of work stations, in each of which there is a forming mould. Aside from design variations, each mould comprises two half-moulds that reproduce the shape of the sides of the container and a bottom that reproduces the shape of the base of the container to be obtained.

The parison, previously heated, is introduced into the mould and the mouth is sealed by a closing member—the "seal" or blowing nozzle—through which compressed air is insufflated inside the parison itself.

In the initial step of the forming process, the nozzle sends air into the parison at medium pressure (maximum 15 bar) and, simultaneously, a stretching rod is gradually introduced into the parison until it reaches the bottom. After having touched the bottom, the stretching rod continues its linear stroke so as to stretch the parison until substantially reaching the desired length of the container to be obtained.

Subsequently, the nozzle insufflates air at high pressure (about 40 bar) so as to expand the parison until it adheres to the inside walls of the half-moulds and of the bottom. Simultaneously, the stretching rod retracts until it exits from the container.

At the end of forming, the containers pass to a filling unit and, subsequently, a closing and/or capping unit.

The reference field for the present invention is the bottling of so-called "sensitive" food products, i.e. products that are particularly sensitive to bacteriological contamination and oxidation, such as, for example, isotonic drinks, juices, nectars, soft drinks, tea, milk-based drinks, coffee-based drinks, etc., for which the prevention of possible microbiological contamination throughout all packaging stages is of fundamental importance.

The Applicant has developed a method for bottling containers wherein the different treatment steps (e.g. forming, filling, closing) and transport of the parisons and/or containers are performed inside microbiological isolators that define contamination-controlled environments. All the means for actuating the mobile organs located inside the isolators are placed outside the isolators themselves (see European patent EP2279850).

The preliminary sterilisation step involves all the devices that come into contact with the containers or the parisons, with the evident structural complexity and waste of time.

DISCLOSURE OF THE INVENTION

In this context, the technical task underpinning the present invention is to provide a bottling apparatus in aseptic conditions for containers made of thermoplastic material, that obviates the drawbacks of the prior art mentioned above.

In particular, it is an object of the present invention to provide a bottling apparatus in aseptic conditions for containers made of thermoplastic material, that allows the mobile organs situated in the isolated environment to be moved accurately and quickly.

Another object of the present invention is to propose a bottling apparatus in aseptic conditions for containers made of thermoplastic material, that is structurally simpler and more compact with respect to the prior-art solutions.

The defined technical task and the specified aims are substantially achieved by a bottling apparatus in aseptic conditions for containers made of thermoplastic material, comprising:

- at least one mobile organ partially situated in a contamination-controlled environment isolated from an external environment;
- an actuation device for actuating said at least one mobile organ, characterised in that the actuation device comprises a linear motor, in turn comprising:
  - a cylindrical stator;
  - a rotor or magnetic shaft linearly sliding in said cylindrical stator and spaced therefrom in such a way that between the cylindrical stator and the rotor a separation volume is obtained, said rotor being integrally connected to said mobile organ;
  - at least one grooved surface that faces the inside of the separation volume to allow a sanitising fluid to enter and exit from said separation volume.

According to one embodiment, the linear motor further comprises a guide element housed in the separation volume and the grooved surface corresponds to the inner side surface of the guide element.

Preferably, the inner side surface of the guide element has at least one groove having a helicoidal development.

More preferably, the inner side surface of the guide element has a plurality of grooves, each of which has a helicoidal development.

In particular, the grooves have helicoidal developments for the entire length of the guide element.

Preferably, the helicoidal developments of the grooves are distinct, i.e. they do not intersect.

According to another embodiment, the grooved surface corresponds to the side surface of the rotor.

Preferably, the side surface of the rotor has at least one groove having a helicoidal development.

More preferably, the inner side surface of the rotor has a plurality of grooves, each of which has a helicoidal development.

According to another embodiment, the grooved surface corresponds to the side surface only of a first portion of the rotor.

Preferably, the grooved surface has at least one groove having a helicoidal development.

More preferably, the grooved surface has at least a plurality of grooves, each of which has a helicoidal development.

The mobile organ can be chosen from one of the following:

- a blowing nozzle;
- a driving organ that drives the opening and closing of a forming mould of the bottling apparatus;
- a driving organ that drives the rising and lowering of a bottom of the bottling apparatus;
- a pushing element that expels the containers to be discarded;
- a gripper that is operatively active on the neck of one of the containers.

BRIEF DESCRIPTION OF DRAWINGS

Further characteristics and advantages of the present invention will more fully emerge from the non-limiting description of a preferred but not exclusive embodiment of a bottling apparatus in aseptic conditions for containers made of thermoplastic material, as illustrated in the accompanying drawings, in which.

DETAILED DESCRIPTION OF PREFERRED EMBODIMENTS OF THE INVENTION

With reference to the figures, the number 1 indicates a bottling apparatus in aseptic conditions for containers 100 made of thermoplastic material.

In this context, the term container 100 indicates both a formed container and a parison made of thermoplastic material.

Figure 1:
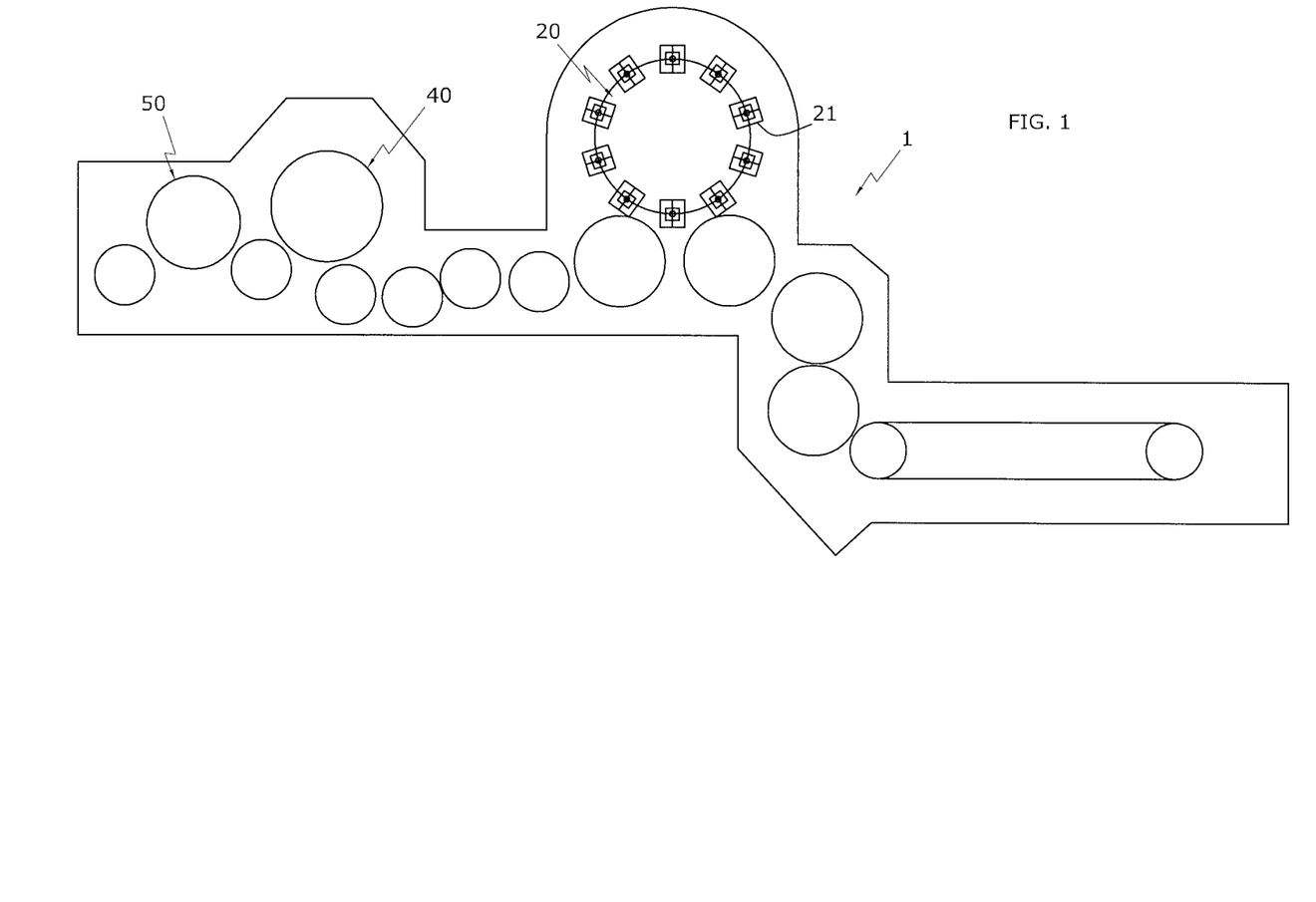
FIG. 1 illustrates a plan view of a bottling apparatus in aseptic conditions for containers made of thermoplastic material according to the present invention.

The bottling apparatus 1 comprises, for example:
- a forming unit 20 for stretch-blowing having a plurality of forming stations 21 in each of which a forming mould 22, a bottom 23 and a blowing nozzle 24 (also known as seal) can be found;
- a filling unit 40 for filling the formed containers 100, having a plurality of filling stations in each of which a filling nozzle is arranged;
- a closing unit 50 for closing the filled containers 100, having a plurality of closing or capping stations in each of which a closing or capping head is arranged.

The bottling apparatus 1 comprises at least one mobile organ partially situated in a contamination-controlled environment 3 and an actuation device 6 for actuating the mobile organ.

Figure 2A:
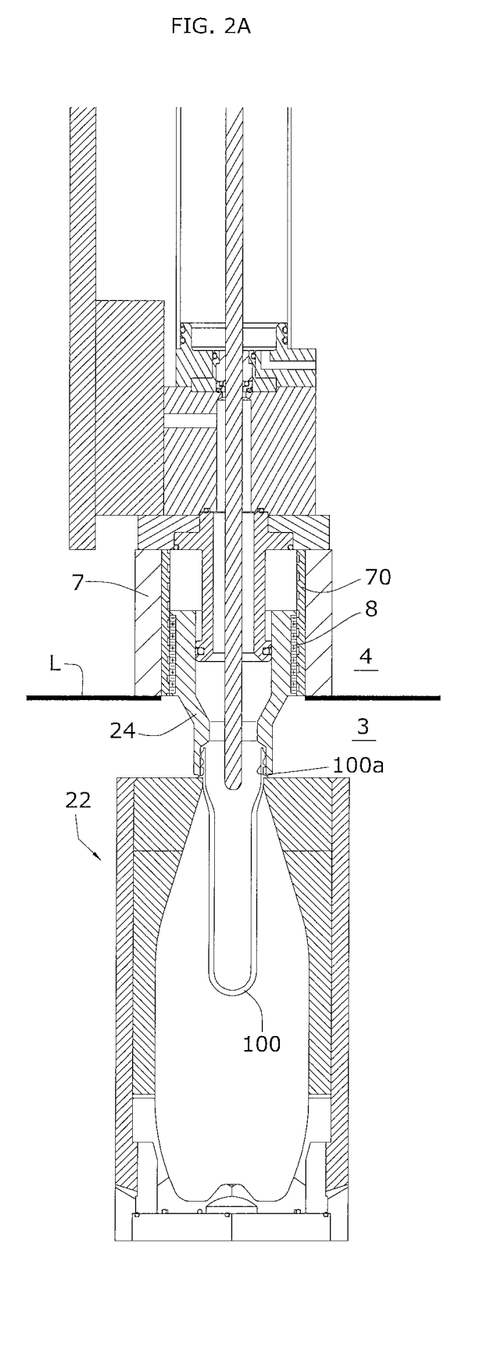
FIGS. 2A-2B illustrate two different steps of moving the blowing nozzle of a forming station of the bottling apparatus of FIG. 1, in a sectional side view.
Figure 2B:
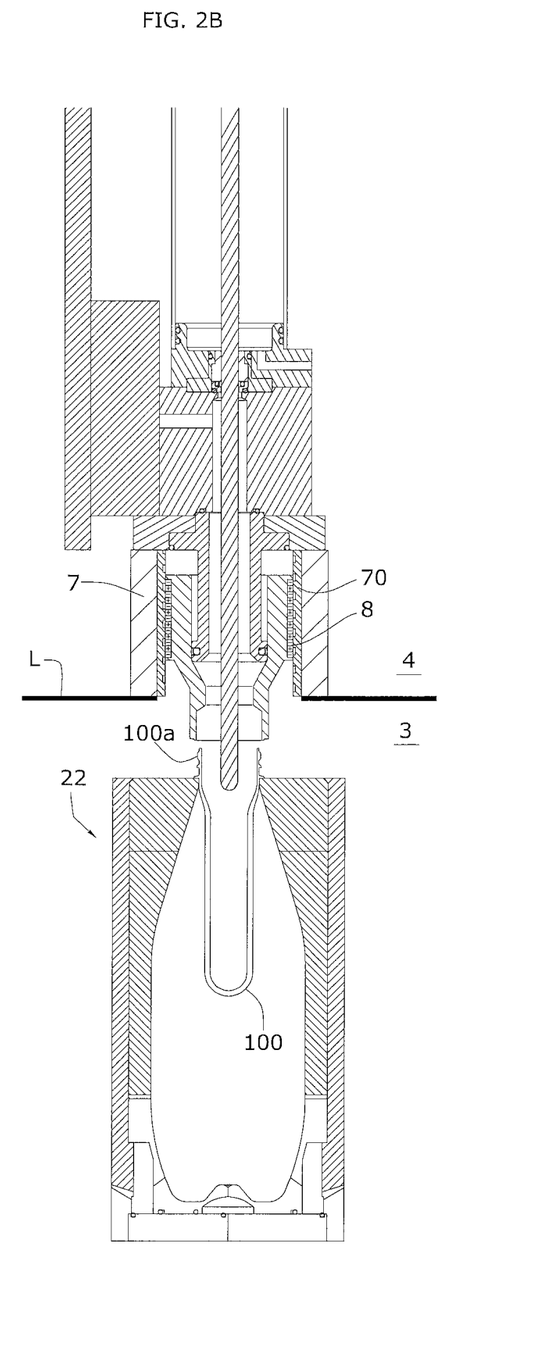
Figure 3A:
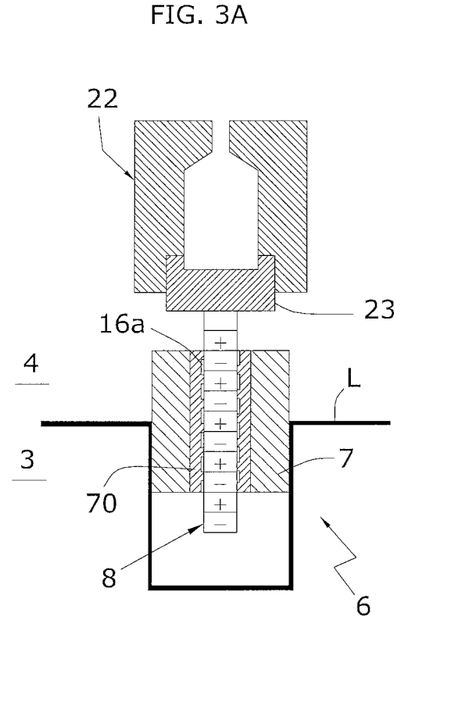
FIGS. 3A-3B illustrate two different steps of moving a bottom of the forming station of the bottling apparatus of FIG. 1, in a sectional side view.
Figure 3B:
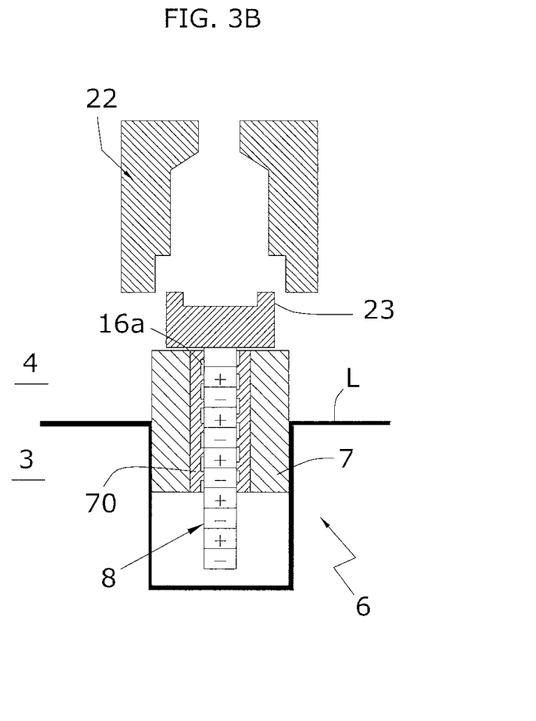
Figure 4A:
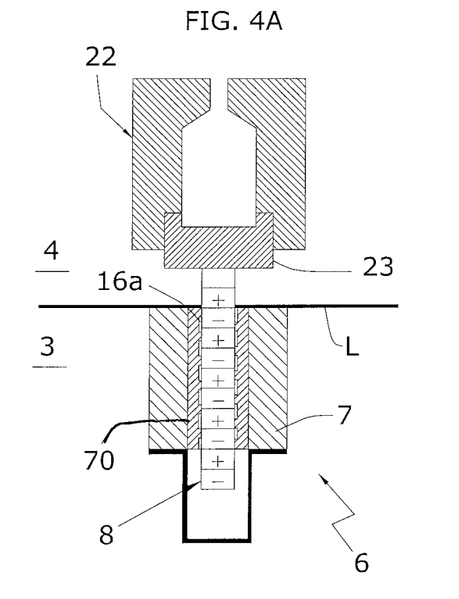
FIGS. 4A-4B illustrate a variant of the embodiment illustrated in FIGS. 3A-3B.
Figure 4B:
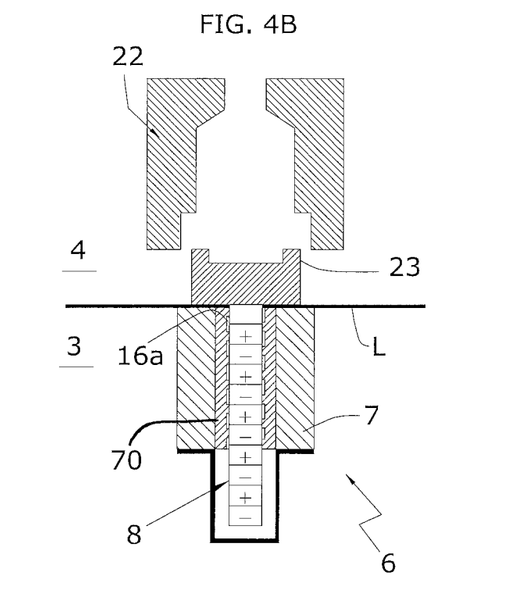

The mobile organ may be a blowing nozzle 24 of one of the forming stations 21, as illustrated in FIGS. 2A-2B.

The mobile organ may be a driving organ that drives the opening and closing of one of the forming moulds 22.

The mobile organ may be a driving organ that drives the rising and lowering of one of the bottoms 23, as illustrated in FIG. 3A-3B or 4A-4B.

Figure 5A:
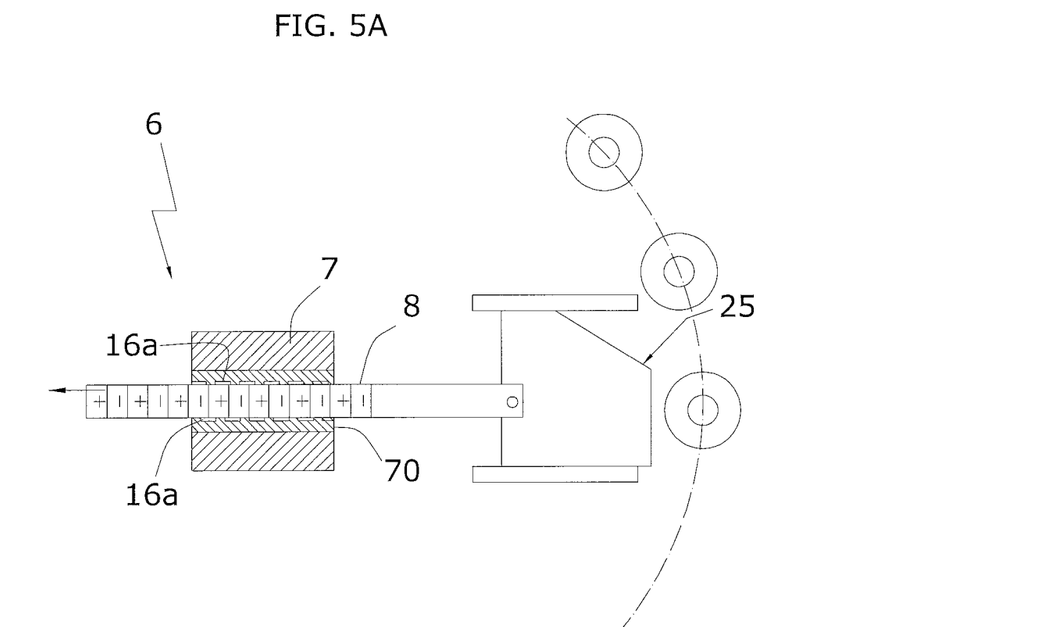
FIGS. 5A-5B illustrate two different steps of moving an ejector of the bottling apparatus of FIG. 1, in a sectional side view.
Figure 5B:
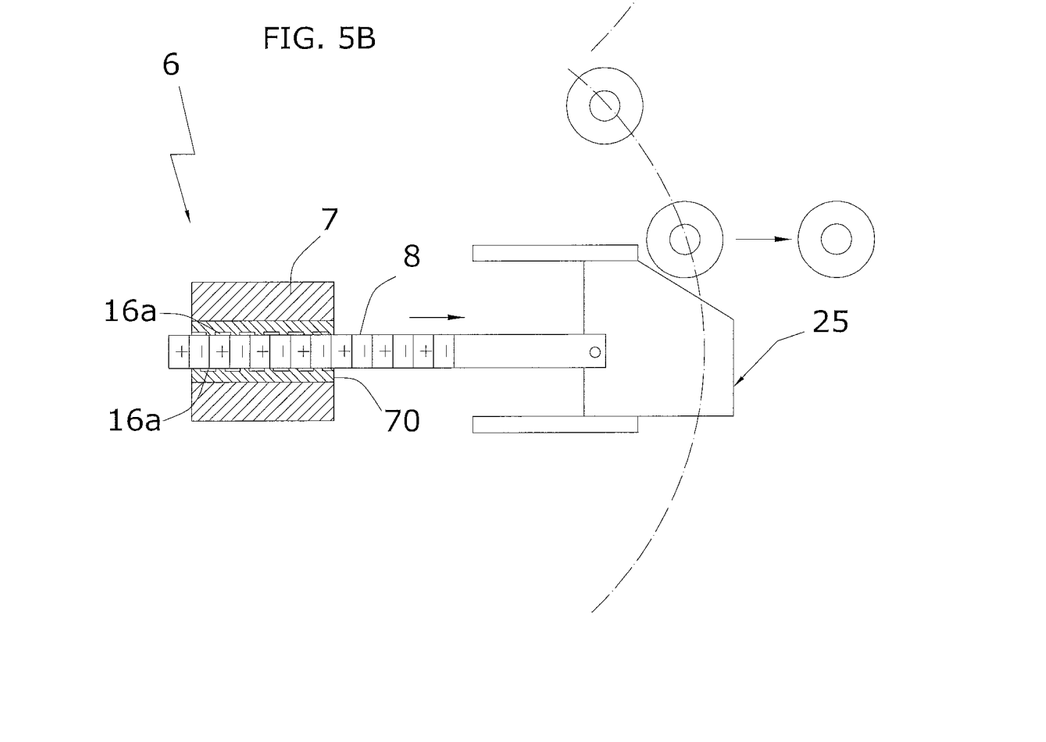

The mobile organ may be a pushing element or ejector 25 that expels the containers 100 to be discarded from the bottling apparatus 1, as illustrated in FIGS. 5A-5B.

The mobile organ may be a gripper that is operatively active on the neck 100a of one of the containers 100.

The contamination-controlled environment 3 is isolated, i.e. physically separated, with respect to an external (contaminated) environment 4 by an isolation device. Such isolation device is not the subject matter of the present invention, therefore it will not be further described or illustrated. By way of example, the isolation device described and illustrated in patent EP2246176 can be used.

In FIGS. 2A-2B, 3A-3B, 4A-4B, the separation between the contamination-controlled environment 3 and the external environment 4 is represented schematically by a line L.

The actuation device 6 comprises a linear motor, in turn comprising:
- a cylindrical stator 7 (primary);
- a rotor or magnetic shaft 8 (secondary) linearly sliding in the cylindrical stator 7.

As in all linear motors, the stator 7 houses the windings while the rotor 8 houses a plurality of permanent magnets.

The rotor 8 has a cylindrical development and the stator 7 has the shape of a hollow cylinder, coaxial to the rotor 8 and placed at a predetermined distance from the latter so that a separation volume is defined between the cylindrical stator 7 and the rotor 8.

For example, the predetermined distance between the inner side surface of the stator 7 and the side surface of the rotor 8 is comprised between 0.5-3 mm.

The rotor 8 has a longer length with respect to the stator 7. Preferably, the rotor 8 has a length that is about twice that of the stator 7.

The rotor 8 is integrally connected to the mobile organ, e.g. the bottom 23 or the blowing nozzle 24 or the ejector 25.

Advantageously, the linear motor 6 comprises at least one grooved surface 14, 15, 18 that faces the inside of the separation volume to allow a sanitising fluid to enter and exit from such volume.

Figure 6A:
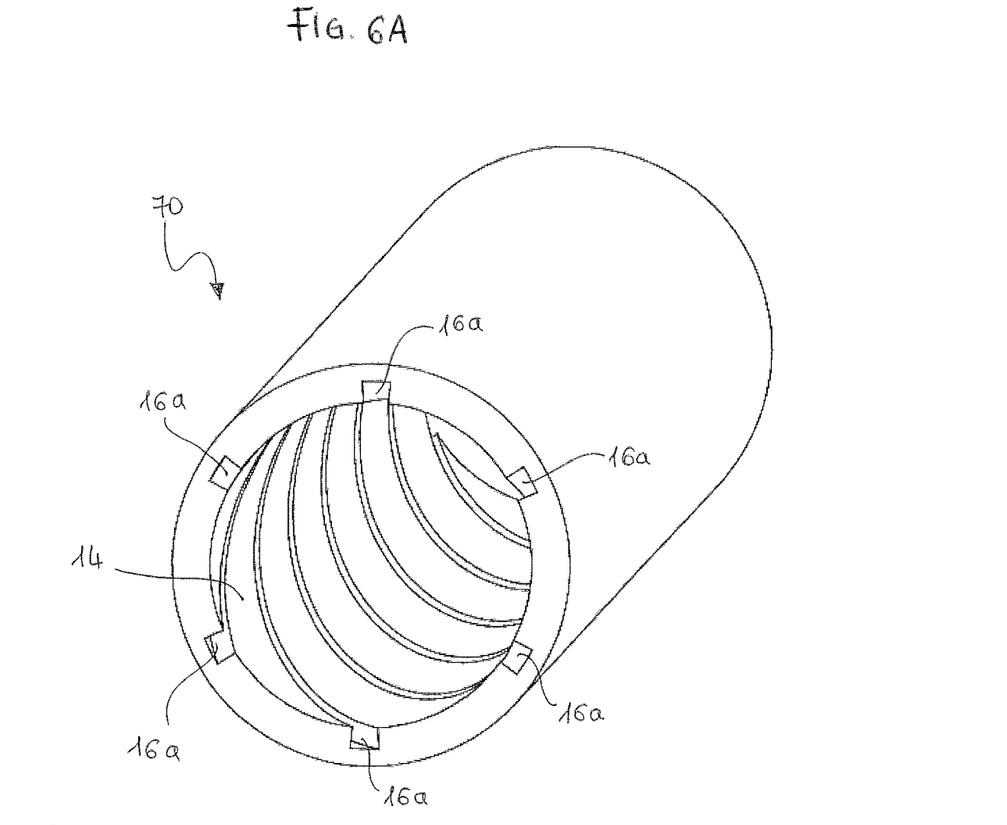
FIGS. 6A, 6B and 6C illustrate a part (guide element) of the linear motor that can be used in moving a mobile element of the bottling apparatus of FIG. 1, respectively in a perspective view, in cross section and in longitudinal section.
Figure 6B:
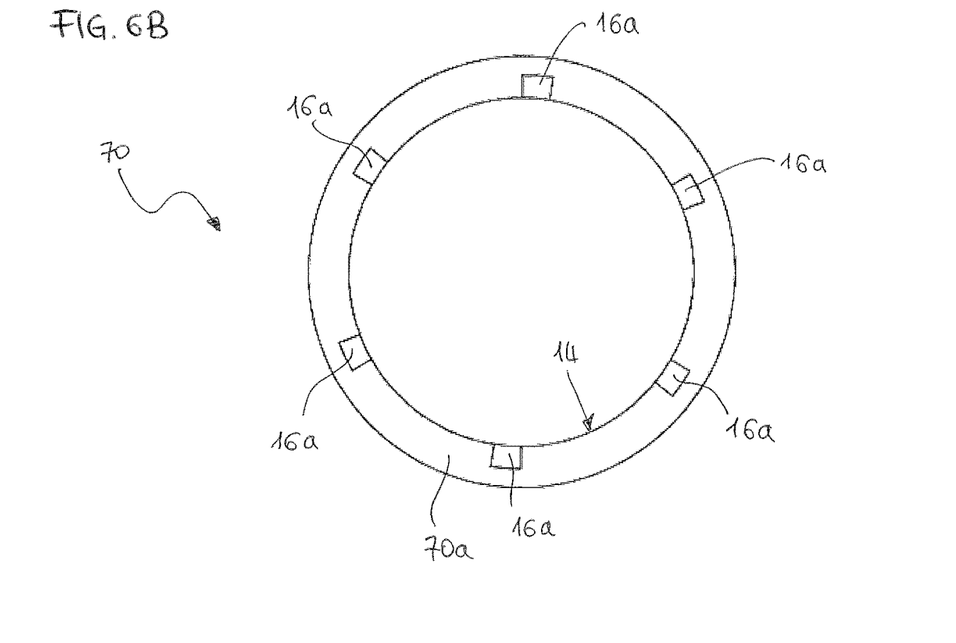
Figure 6C:
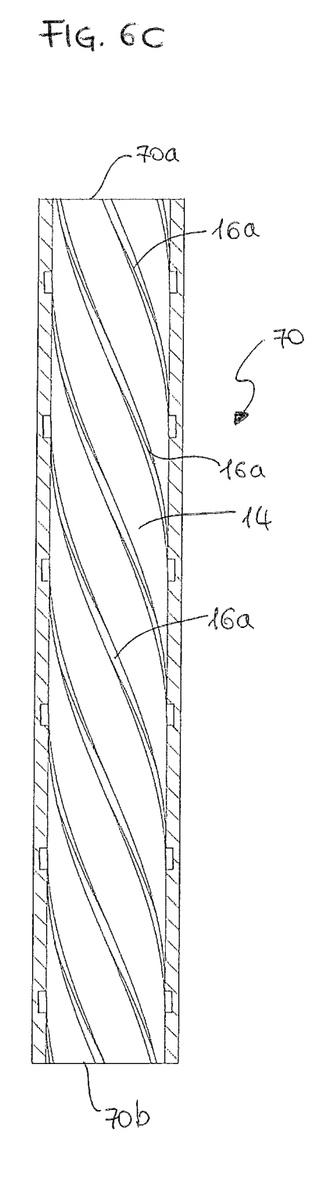

According to a first embodiment, illustrated in FIGS. 6A to 6C, the linear motor 6 comprises a guide element 70 (also known as "bush") housed in the separation volume.

The guide element 70 is substantially shaped like a hollow cylinder.

It is to be noted that the predefined distance between the rotor 8 and the stator 7 actually allows the interposition of the guide element 70.

In the first embodiment, the grooved surface corresponds to the inner side surface 14 of the guide element 70. Inner side surface 14 of the guide element 70 means the inner surface extension of the hollow cylinder that constitutes the guide element 70.

For example, the inner side surface 14 of the guide element 70 has at least one groove 16a having a helicoidal development. Preferably, the inner side surface 14 of the guide element 70 has a plurality of grooves 16a, each of which has a helicoidal development.

For example, FIGS. 6A to 6C illustrate a guide element 70 having six grooves 16a that originate from a base 70a of the guide element 70 and have a helicoidal development for the entire length of the latter (in the inner side surface 14) ending at the opposite base 70b of the guide element 70 itself.

Figure 6D:
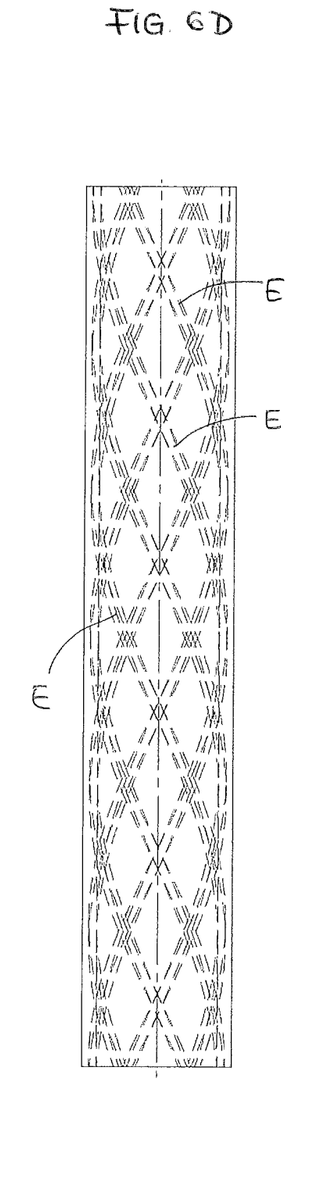
FIG. 6D schematically illustrates the helicoidal paths of the grooves made in the guide element of FIG. 6A-6C.

Each of such grooves 16a is independent from the others, i.e. the grooves 16a extend along distinct helicoidal paths, i.e. that do not intersect. For example, FIG. 6D schematically illustrates the helicoidal paths (indicated with letter E) of the six grooves 16a.

In one alternative (not illustrated), the inner side surface 14 of the guide element 70 has one or more grooves that follow the longitudinal development of the guide element 70.

FIGS. 2A-2B, 3A-3B, 4A-4B, 5A-5B illustrate a linear motor according to this first embodiment.

Figure 7A:
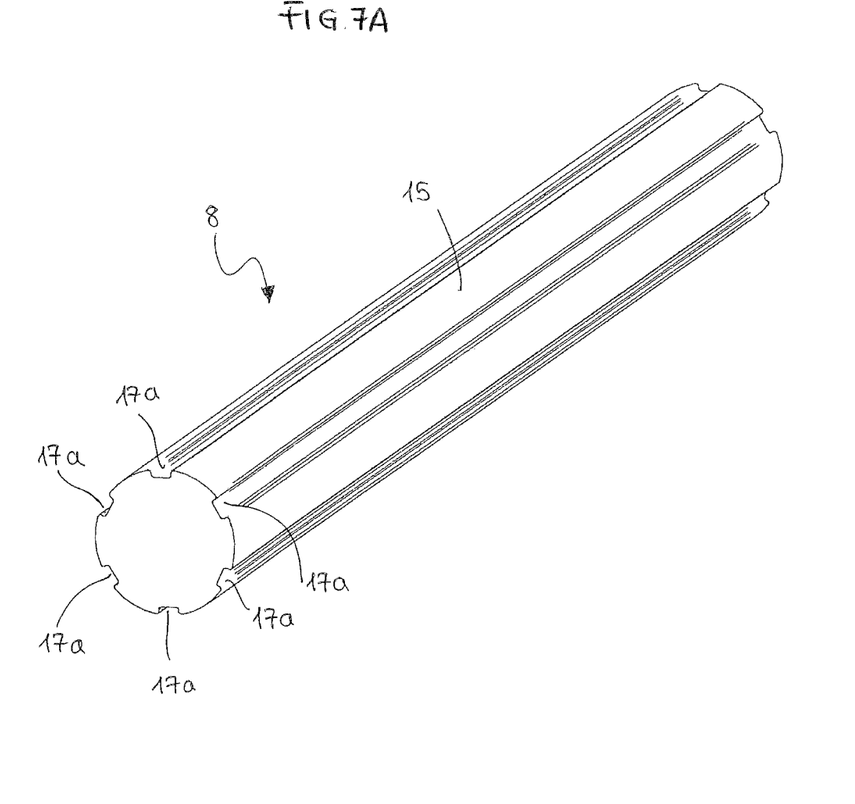
FIGS. 7A and 7B illustrate a part (rotor with longitudinal grooves) of the linear motor that can be used in moving a mobile element of the bottling apparatus of FIG. 1, respectively in a perspective view and in cross section.
Figure 7B:
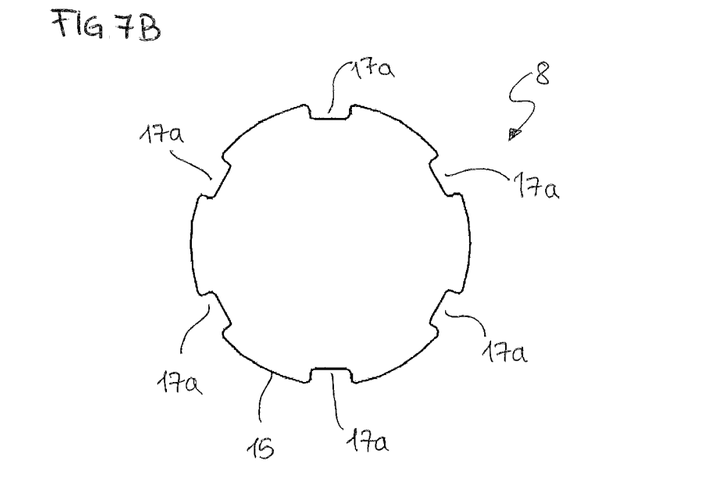
Figure 7C:
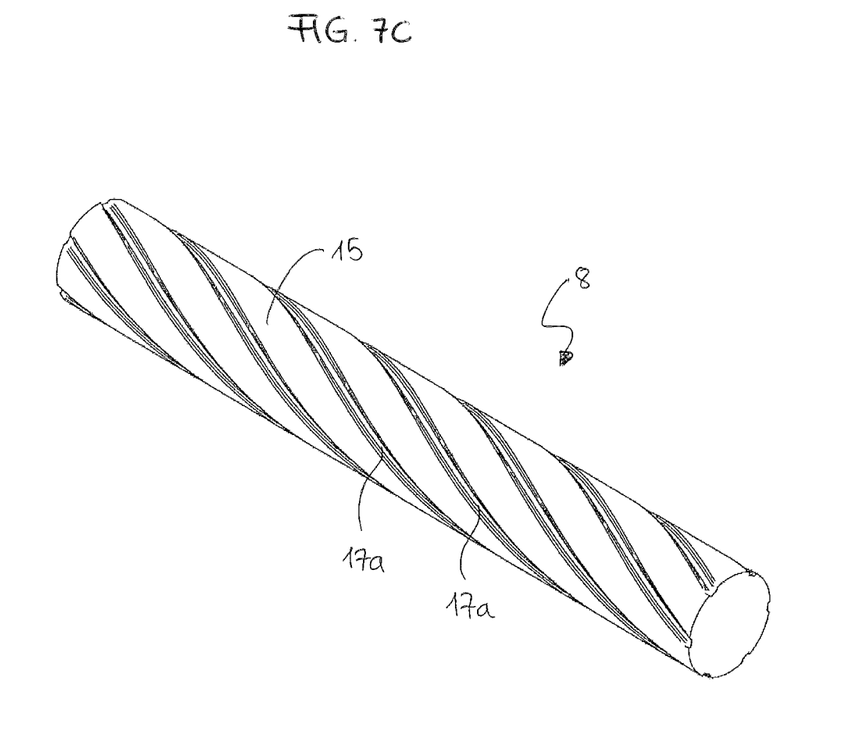
FIG. 7C illustrates a variant of the rotor of FIGS. 7A-7B, with helicoidal grooves, in a perspective view.

In a second embodiment, illustrated in FIGS. 7A-7C, the grooved surface corresponds to the side surface 15 of the rotor 8. Side surface 15 of the rotor 8 means the surface extension of the cylinder that constitutes the rotor 8.

For example, the side surface 15 of the rotor 8 has at least one groove 17a that follows the longitudinal extension of the rotor 8.

Preferably, the side surface 15 of the rotor 8 has a plurality of parallel grooves 17a that follow the longitudinal extension of the rotor 8 (see FIG. 7A).

In one alternative, illustrated in FIG. 7C, the side surface 15 of the rotor 8 has one or more grooves 17a having a helicoidal development.

In the applications of FIGS. 2A-2B, 3A-3B, 4A-4B, 5A-5B it is possible to substitute the linear motor according to the first embodiment with a linear motor according to the second embodiment.

Figure 8:
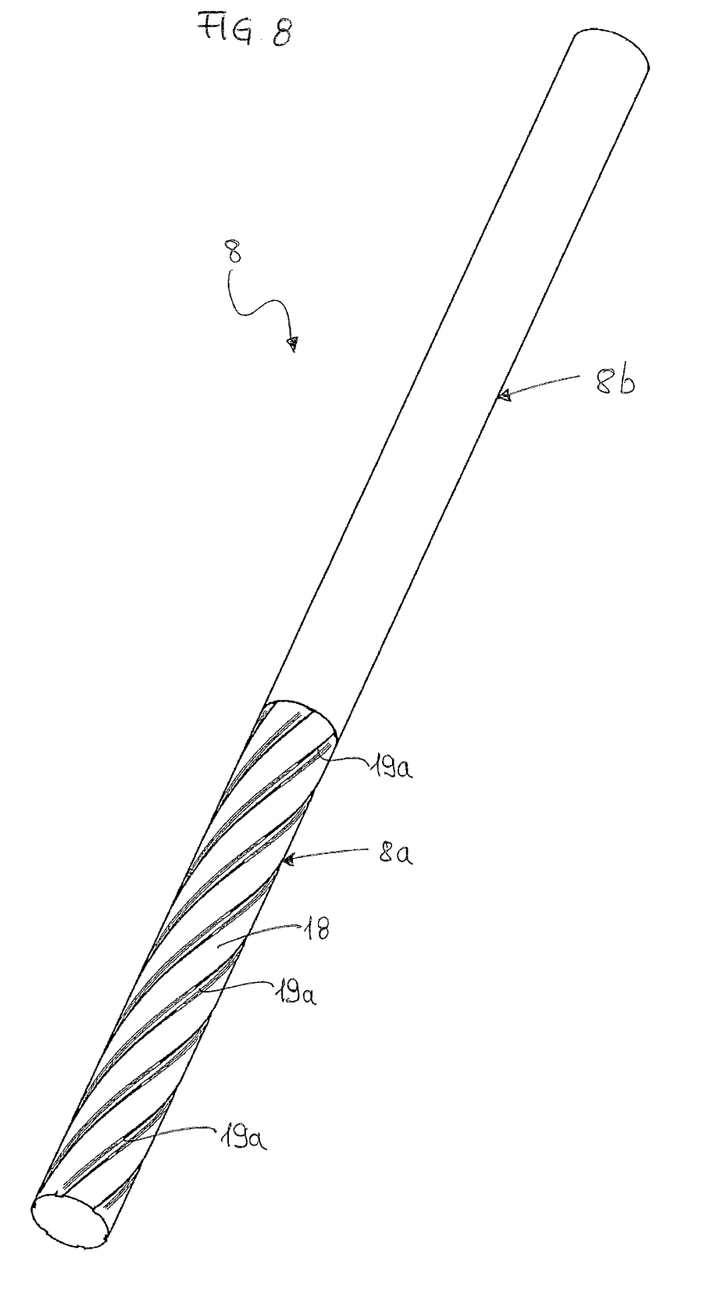
FIG. 8 illustrates a part (rotor) of the linear motor that can be used in moving a mobile element of the bottling apparatus of FIG. 1, in a perspective view.

In a third embodiment, illustrated in FIG. 8, the grooved surface corresponds to the side surface 18 only of a first portion 8a of the rotor 8. As illustrated in FIG. 8, the rotor 8 is formed by two portions: a first portion 8a and a second portion 8b. The second portion 8b houses a first group of permanent magnets and has a smooth side surface, i.e. not grooved. The first portion 8a houses a second group of permanent magnets, having a smaller diameter with respect to the permanent magnets of the first group. As mentioned above, the first portion 8a of the rotor 8 has a grooved side surface 18.

The first portion 8a of the rotor 8 is integrally connected to the mobile organ.

In particular, the grooved surface 18 has at least one groove 19a having a helicoidal development.

Preferably, the grooved surface 18 has a plurality of grooves 19a, each of which has a helicoidal development (see FIG. 8).

In one alternative (not illustrated), the grooved surface 18 has one or more grooves that follow the longitudinal development of the rotor 8.

In the applications of FIGS. 2A-2B, 3A-3B, 4A-4B, 5A-5B it is possible to substitute the linear motor according to the first embodiment with a linear motor according to the third embodiment.

The operation of the bottling apparatus in aseptic conditions for containers made of thermoplastic material, according to the present invention, is described below.

The electromagnetic field produced by the current that flows in the windings of the stator 7 causes the sliding of the rotor 8. Being integral with the rotor 8, the mobile organ is consequently moved.

With regard to the first and second embodiment, the separation volume can be sanitised by inserting a sanitising fluid during the normal operating cycle of the mobile organ.

Alternatively, the sanitisation can also be performed as a distinct step with respect to the normal operation of the mobile organ.

In that case, during sanitisation, the rotor 8 can possibly slow down or stop during its movement, before restarting its stroke. In this way, the sanitisation of contact surfaces is facilitated.

With reference to the first embodiment, the sanitising fluid flows over the rotor 8 and, through the grooves 16a (e.g. with a helicoidal development) obtained in the inner side surface 14 of the guide element 70, reaches the mobile organ.

With reference to the second embodiment, the sanitising fluid flows over the rotor 8 and, through the grooves 17a (e.g. with a helicoidal development) obtained in the side surface 15 of the rotor 8, reaches the mobile organ.

With regard to the third embodiment, instead, during the normal operation of the mobile organ, the second portion 8b of the rotor 8 enters and exits from the stator 7, whereas the first portion 8a of the rotor 8 (the grooved one) always remains outside the stator 7.

In this way, the performance of the linear motor 6 during normal operation of the mobile organ is optimal as the second portion 8b of the rotor 8 has permanent magnets with a larger dimension not having grooves.

In this embodiment, the sanitising cycle is performed separately with respect to the normal operation of the mobile organ.

In fact, during sanitisation, the first portion 8a of the rotor 8 (the grooved one) is brought into the stator 7. The sanitising fluid flows over the first portion 8a of the rotor 8 and, through the grooves 19a (e.g. with a helicoidal development) obtained in the side surface 18 of the first portion 8a of the rotor 8, reaches the mobile organ.

The characteristics and the advantages of the bottling apparatus in aseptic conditions of containers made of thermoplastic material, according to the present invention, prove to be clearly indicated in the description provided.

In particular, the use of a linear motor for moving the mobile organ allows the direct driving of the load, preventing having to provide motion transformation members, with consequent advantages in terms of precision.

The creation of grooves in the linear motor allows the passage of sanitising fluid and the cleaning of the surfaces of the motor which are subject to rubbing.

The helicoidal shape of the grooves of the guide element (first embodiment) or of the rotor (second embodiment) represents the optimal choice for sanitisation.

In particular, the guide element with helicoidal grooves (first embodiment) allows complete sanitisation of the rotor also in the case in which its stroke is not double the length of the stator. The rotor with helicoidal grooves (second embodiment) allows the complete sanitisation of the guide element.

On the other hand, the creation of longitudinal grooves in the guide element (first embodiment) or in the rotor (second embodiment) represents a technically easier and cheaper solution.

In the second embodiment, the creation of helicoidal grooves in the rotor represents the most efficient solution for sanitisation as the rotor translates with respect to the stator during the operation of the mobile organ. Therefore, the sanitising fluid can flow across a larger area.

Then, the third embodiment combines the advantage of facilitating sanitisation without compromising the performance of the linear motor during normal operation of the mobile organ.

The invention claimed is:

1. Bottling apparatus (1) in aseptic conditions for containers (100) made of thermoplastic material, comprising:

at least one mobile organ (23; 24; 25) partially located in a contamination-controlled environment (3) that is isolated from an external environment (4);

an actuation device (6) for actuating said at least one mobile organ (23; 24; 25), characterised in that said actuation device (6) comprises a linear motor in turn comprising:

a cylindrical stator (7);

a rotor or magnetic shaft (8) linearly sliding in said cylindrical stator (7) and spaced thereto in such a way that between the cylindrical stator (7) and the rotor (8) a separation volume is obtained, said rotor (8) being integrally connected to the mobile organ (23; 24; 25);

at least one grooved surface (14, 15, 18) exposing within the separation volume in order to allow a sanitizing fluid to enter and to exit from said separation volume.

2. Bottling apparatus (1) according to claim 1, wherein said linear motor (6) further comprises a guide member (70) located in said separation volume, said at least one grooved surface corresponding to the inner side surface (14) of said guide member (70).

3. Bottling apparatus (1) according to claim 2, wherein the inner side surface (14) of said guide member (70) has at least one groove (16a) having a helicoidal development.

4. Bottling apparatus (1) according to claim 3, wherein the inner side surface (14) of said guide member (70) has a plurality of grooves (16a), each having a helicoidal development.

5. Bottling apparatus (1) according to claim 4, wherein said grooves (16a) have helicoidal developments along the entire length of the guide member (70).

6. Bottling apparatus (1) according to claim 4 or 5, wherein the helicoidal developments of said grooves (16a) are distinct, that is they do not intersect.

7. Bottling apparatus (1) according to claim 1, wherein said at least one grooved surface corresponds to the side surface (15) of the rotor (8).

8. Bottling apparatus (1) according to claim 7, wherein said side surface (15) of the rotor (8) has at least one groove (17a) having a helicoidal development.

9. Bottling apparatus (1) according to claim 8, wherein said side surface (15) of the rotor (8) has a plurality of grooves (17a) each having a helicoidal development.

10. Bottling apparatus (1) according to claim 1, wherein said at least one grooved surface corresponds to the side surface (18) of only one first portion (8a) of the rotor (8).

11. Bottling apparatus (1) according to claim 10, wherein said grooved surface (18) has at least one groove (19a) having a helicoidal development.

12. Bottling apparatus (1) according to claim 11, wherein said grooved surface (18) has at least a plurality of grooves (19a), each having a helicoidal development.

13. Bottling apparatus (1) according to any of the claims 1 to 12 claim 1, wherein said mobile organ is a blowing nozzle (24).

14. Bottling apparatus (1) according to claim 1, wherein said mobile organ is a driving organ that drives the opening and closing of a blowing mould (22) of the bottling apparatus (1).

15. Bottling apparatus (1) according to claim 1, wherein said mobile organ is a driving organ that drives the rising and lowering of a bottom (23) of the bottling apparatus (1).

16. Bottling apparatus (1) according to claim 1, wherein said mobile organ is a pushing element (25) that expels the containers (100) to be discarded.

17. Bottling apparatus (1) according to claim 1, wherein said mobile organ is a gripper that is operatively active on the neck (100a) of one of the containers (100).

* * * * *

UNITED STATES PATENT AND TRADEMARK OFFICE
CERTIFICATE OF CORRECTION

| | |
|---|---|
| PATENT NO. | : 11,167,467 B2 |
| APPLICATION NO. | : 16/648838 |
| DATED | : November 9, 2021 |
| INVENTOR(S) | : Callegari et al. |

Page 1 of 1

It is certified that error appears in the above-identified patent and that said Letters Patent is hereby corrected as shown below:

In the Claims

Column 7, Line 33 (Claim 6), after "4" delete "or 5".

Signed and Sealed this
Twenty-fourth Day of May, 2022

*Katherine Kelly Vidal*

Katherine Kelly Vidal
*Director of the United States Patent and Trademark Office*